Patented July 18, 1950

2,515,335

UNITED STATES PATENT OFFICE 2,515,335

METHOD OF CONDENSING 1,3-DICHLOROBUTENE-2 WITH AROMATIC HYDROCARBONS

Jaroslav Čech and Vladimír Albrecht, Zlin, Czechoslovakia, assignors to Bata, narodni podnik, Zlin, Czechoslovakia No Drawing. Application January 8, 1947, Serial No. 720,912. In Germany January 31, 1941

Section 1, Public Law 690, August 8, 1946
Patent expires January 31, 1961

3 Claims. (Cl. 260—623)

It has been proposed in the British Patent No. 443,113 to condense 1,3-dichlorobutene-2 with phenolic or chlorphenolic alkali salts in a boiling benzene solution in presence of alkali hydroxides. It was however not known that this reaction can be performed even without the alkaline substances but in the presence of dry chlorides of metals as catalysts, similar to the known condensation of alkylhalogenides with aromatic hydrocarbons according to Friedel and Crafts.

According to the invention aromatic hydrocarbons or their hydroxy derivatives are condensed with 1,3-dichlorobutene-2 in the presence of anhydrous chlorides of aluminum, zinc or iron, or if desired a mixture of these catalysts. The thus obtained condensation products can be used for different purposes, e. g. as desinfectants, as intermediates of the dyestuff or pharmaceutic industry, especially however as softening and plasticizing material for natural or artificial rubber to which it imparts in the vulcanized state an increased tensile strength, increasing at the same time the resistance against organic solvents, such as gasoline. When zinc chloride is used as catalyst and is neutralized after reaction is completed by adding some alkaline substance, the obtained mixture not only acts as softener, but also as an activator of the vulcanization. In this case the catalyst will not be removed from the reaction product. For technical purposes various mixtures of aromatic hydrocarbons or their hydroxy derivatives will be used as starting material, in some cases mixtures of aromatic hydrocarbons with their hydroxy derivatives of various kinds and in various proportions.

The condensation can be carried out at normal or increased temperature, advantageously up to 80° C. After the condensation is completed, the catalysts can be washed out with water or aqueous solutions and thereafter the product is dehydrated. When using zinc chloride, a neutralization with alkaline solutions instead of the washing out can be advantageous whereby the zinc chloride will be converted into insoluble zinc hydroxide. The resulting product, containing zinc oxide after the dehydration, acts not only as softening and plastifying material, but also as an activator of vulcanization.

By adding condensation products, according to the invention, to raw, unvulcanized rubber, very soft, plastic mixtures are originated that can be very easily mixed with other customary admixtures such as carbon black, metal oxides, various fillers, etc.

Example 1

1 gram molecule of naphthalene is mixed with 1 gram molecule of aluminum chloride and thereafter a little over 1 gram molecule of raw 1,3-dichlorobutene-2 in form of a distillation residue obtained in the rectification of chloroprene will be added. The reaction mixture liquefies slowly. After the reaction is completed the condensation product is washed out with water, dried and in this state used without further cleaning as softening material for rubber.

Example 2

1 gram molecule of naphthalene is mixed with 1 gram molecule of 1,3-dichlorobutene-2 or with a somewhat larger amount of raw dichlorobutene in form of a distillation residue obtained in the rectification of chloroprene and with 0.1 gram molecule of zinc chloride. In this case the reaction will be speeded up, if the temperature is from the very beginning raised to 60–80° C. The reaction product will be neutralized with an alkali compound, e. g. ammonium or sodium hydroxide or some organic base. In the crude state, ready for use as softening material for rubber, it forms a dark, thick, semi-liquid tarry mass, only partly soluble in customary rubber solvents, such as benzene or gasoline. The determination of chemical structure shows it to be essentially 8-chlorocrotylnaphthalene. The position of the substituent in the nucleus is unknown, it is possible that there is a mixture of several isomers.

Example 3

1 gram molecule of phenol is mixed with 0.1 gram molecule of anhydrous aluminum chloride and 1 gram molecule of 1,3-dichlorobutene-2. The condensation is completed under moderate heating. A mixture of isomeric chlorocrotylphenols is formed which is suitable for preparation of plastics, dyestuffs or pharmaceutical products. After some time the mixture partly dissociates with liberation of hydrogen chloride whereas in the chlorocrotyl derivatives themselves in nonhydroxylated hydrocarbons in chlorine is in the neighbourhood of a double bond relatively strongly bound and shows a very small reactivity.

Example 4

The technical effect of the reaction products according to this invention is well apparent from the following example: Raw chloroprene rubber was mixed on a calender with a condensation product, prepared according to the Example 2, added in an amount of 10% of the weight of the raw rubber. A very plastic mixture was formed that was very easily mixable with the usual admixtures.

Constitution of the mixture:

| | Parts |
|---|---|
| Raw chloroprene rubber | 400 |
| Softening material obtained according to Example 2 | 40 |
| ZnO | 30 |
| Carbon black | 180 |

The rubber obtained after vulcanizing was very resistant against chemical agents and very suitable for technical purposes. In order to find out the influence of the new softening material on the qualities of manufactured rubber, analogous mixtures have been prepared that differed only in the kind of the softener used. The results are shown in the adjoint tables hereinbelow:

| | Vulcanization Time | | | | | |
|---|---|---|---|---|---|---|
| | 15' Tensile Strength, kg./cm.² | Elongation, Percent | 30' Tensile Strength, kg./cm.² | Elongation, Percent | 60' Tensile Strength, kg./cm.² | Elongation, Percent |
| Mixture according to Example 2 | 206 | 685 | 223 | 590 | 239 | 555 |
| The same mixture but with 10% pine tar | 180 | 650 | 203 | 595 | 190 | 500 |
| The same mixture but with 10% resin | 153 | 600 | 171 | 560 | 197 | 520 |
| The same mixture but with 10% brown factice | 186 | 651 | 214 | 600 | 215 | 526 |

*Example 5*

1 part of the condensation product, obtained according to Example 2 was mixed with 9 parts of butadiene rubber on a calender. The softened raw rubber was compounded into a mixture consisting of the following:

| | Parts |
|---|---|
| Raw butadiene rubber ("Buna SS") | 400 |
| Softener according to Example 2 | 40 |
| ZnO | 30 |
| Sulphur | 5 |
| Vulcanization accelerator | 5 |
| Carbon black | 180 |

The same mixtures have been prepared using the same amount of known softening material. After a vulcanization lasting 40 minutes at 150° C. the following results have been found:

| | Tensile Strength, kg./cm.² | Elongation, Percent |
|---|---|---|
| Rubber according to Example 5 | 221 | 600 |
| The same mixture, but with 10% mineral rubber | 191 | 650 |
| The same mixture, but with 10% brown factice | 215 | 650 |
| The same mixture, but with 10% paraffine | 176 | 630 |
| The same mixture, but with 10% caoutchol | 180 | 680 |

We claim:
1. The process of producing condensation products, particularly suitable as softening or plasticizing material for rubber, comprising the condensation of a compound selected from the group consisting of aromatic hydrocarbons and hydroxy-substituted aromatic hydrocarbons in substantially equimolecular proportions with 1,3-dichlorobutene-2 at temperatures up to 80° C. in the presence of an anhydrous catalyst selected from the group consisting of the halogenides of aluminum, iron and zinc.

2. The process of producing condensation products, comprising the step of condensing a compound selected from the group consisting of aromatic hydrocarbons and hydroxy-substituted aromatic hydrocarbons with 1,3-dichlorobutene-2 in substantially equimolecular proportions in the presence of anhydrous zinc chloride at moderately increased temperatures up to 80° C.; followed by the step of treating the reaction mixture with an alkaline substance in amounts sufficient to convert the zinc chloride into zinc hydroxide.

3. The process of producing condensation products particularly suitable as softening and plasticizing material for rubber, comprising the step of condensing naphthalene in substantially equimolecular proportions with 1,3-dichlorobutene-2 at moderately increased temperature up to 80° C. in presence of a substantially anhydrous catalyst selected from the group consisting of aluminum chloride, zinc chloride and iron chloride; washing the catalyst out with water; and drying the product obtained.

JAROSLAV ČECH.
VLADIMÍR ALBRECHT.

REFERENCES CITED

The following references are of record in the file of this patent:

UNITED STATES PATENTS

| Number | Name | Date |
|---|---|---|
| 2,178,571 | Flett | Nov. 7, 1939 |
| 2,355,850 | Dreisbach | Aug. 15, 1944 |

FOREIGN PATENTS

| Number | Country | Date |
|---|---|---|
| 443,113 | Great Britain | Feb. 20, 1936 |